(12) United States Patent
Edwards

(10) Patent No.: US 6,263,560 B1
(45) Date of Patent: Jul. 24, 2001

(54) SELF-PIERCE RIVET

(75) Inventor: Cyril Kenneth Edwards, Leicester (GB)

(73) Assignee: Ariel Industries PLC (GB)

( * ) Notice: Subject to any disclaimer, the term of this patent is extended or adjusted under 35 U.S.C. 154(b) by 0 days.

(21) Appl. No.: 09/091,613

(22) PCT Filed: Dec. 16, 1996

(86) PCT No.: PCT/GB96/03095

§ 371 Date: Nov. 23, 1998

§ 102(e) Date: Nov. 23, 1998

(87) PCT Pub. No.: WO97/22810

PCT Pub. Date: Jun. 26, 1997

(30) Foreign Application Priority Data

Dec. 20, 1995 (GB) .................................................... 9526003
Jan. 12, 1996 (GB) .................................................... 9600690

(51) Int. Cl.⁷ ...................................................... B23P 19/00
(52) U.S. Cl. ........................ 29/798; 29/525.06; 29/524.1; 411/502
(58) Field of Search ............................... 29/524.1, 525.06, 29/253.53, 432.1, 798; 411/486, 501, 502, 923, 434, 471, 472, 473

(56) References Cited

U.S. PATENT DOCUMENTS

| 231,979 | * | 9/1880 | Ball ...................................... 29/432.1 |
| 951,997 | * | 3/1910 | Stimpson .............................. 411/502 |
| 1,121,641 | * | 12/1914 | Lounsbury ............................ 411/502 |
| 1,639,530 | | 8/1927 | Payson . |
| 3,585,666 | * | 6/1971 | Wahl ...................................... 470/191 |
| 3,606,415 | * | 9/1971 | Friedling et al. ..................... 411/502 |
| 5,359,765 | * | 11/1994 | Auriol et al. ........................ 29/525.2 |
| 5,722,144 | * | 3/1998 | Bora ................................... 29/525.06 |
| 5,752,305 | * | 5/1998 | Cotterill et al. ..................... 29/432.2 |

FOREIGN PATENT DOCUMENTS

WO9535174   6/1995  (WO) .

\* cited by examiner

Primary Examiner—S. Thomas Hughes
Assistant Examiner—Jermie E. Cozart
(74) Attorney, Agent, or Firm—Ira S. Dorman

(57) ABSTRACT

A self-pierce rivet includes a shank and a head at one end of the shank. The other end of the shank of the rivet is provided with an axially extending slot. The head is non-circular and is formed with substantially mutually perpendicular major and minor dimensions, the minor dimension of the head extending substantially parallel to the slot. The shank of the rivet may be provided with a central hole extending from the free end of the shank towards the head. The head of the rivet may be substantially rectangular.

20 Claims, 3 Drawing Sheets

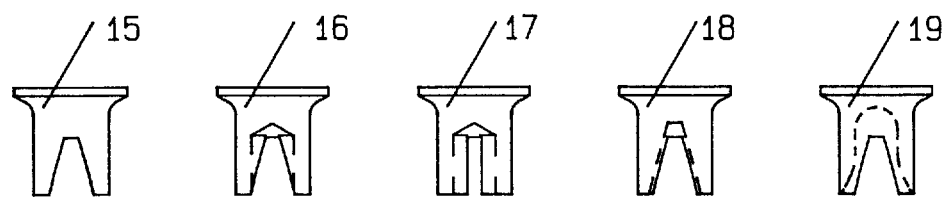
FIG 10.
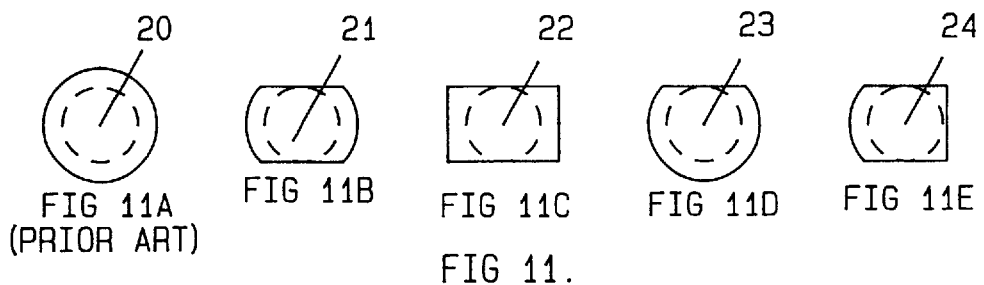
FIG 11A (PRIOR ART)  FIG 11B  FIG 11C  FIG 11D  FIG 11E
FIG 11.
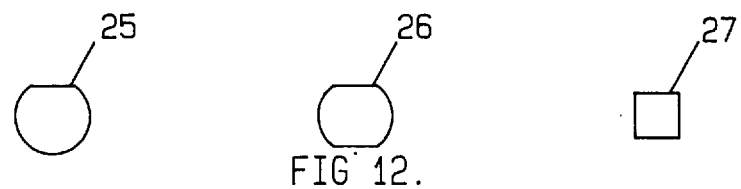
FIG 12.
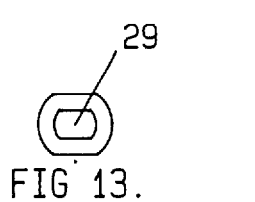
FIG 13.
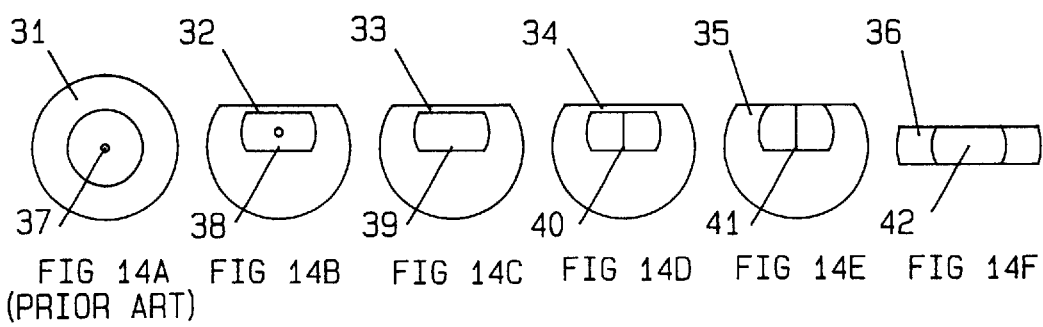
FIG 14A (PRIOR ART)  FIG 14B  FIG 14C  FIG 14D  FIG 14E  FIG 14F
FIG 14.
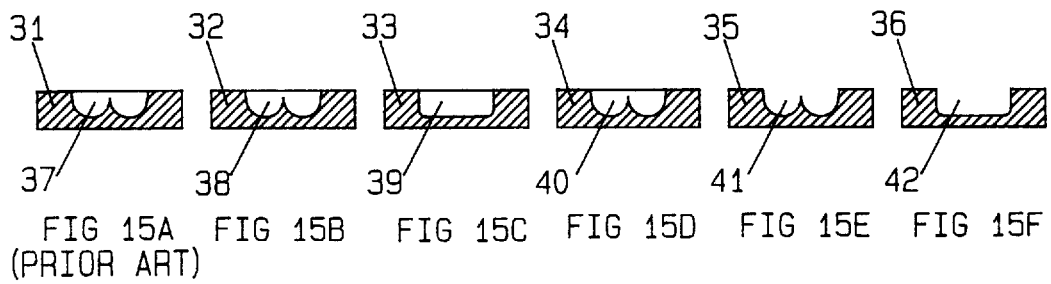
FIG 15A (PRIOR ART)  FIG 15B  FIG 15C  FIG 15D  FIG 15E  FIG 15F
FIG 15.

SELF-PIERCE RIVET

BACKGROUND OF THE INVENTION

The present invention concerns a self-pierce rivet.

Self-pierce rivets in current use have a round head and a round shank and are used in conjunction with a round setting die which has a semi-toroidal cavity and a central anvil. In a typical application the diameter of the shank would be 5 mm, the diameter of the head would be 8 mm and the diameter of the die cavity would be 9 mm.

The term "self-pierce" is normally applied to a semi-tubular rivet used to fasten incompressible materials such as metals. Because the materials are incompressible, the rivet, when applied to a workpiece, displaces a volume of workpiece material equal to the volume of the part of the rivet that enters the material. A principal function of the die is to form the displaced material into a round "button".

There is in common usage another form of self-pierce rivet, generally known as a "bifurcated" rivet. Such a rivet has a slotted shank and is not as strong as a rivet of semi-tubular construction. Consequently, it is normally used to fasten compressible materials such as wood and leather. In this case, the legs of the rivet pierce through the workpiece with far less material displacement and are caused to splay outwardly by the die, thereby securing the components of the workpiece. The die is circular in form and the rivet can be presented to it in any axially angular position.

These designs of self-pierce rivets have limitations in application in that often they cannot allow be applied in the optimum position for effective fastening. For example, when applied to flanges the ideal position for the fastener is one where the shank of the rivet is immediately adjacent to the wall of the flange. With current designs, this is not possible because the rivet head, the rolled portion of the shank, and the displaced material far beyond the shank and consequently the rivet has to be applied in a position offset from the wall. This offset reduces the structural rigidity of the riveted assembly and increases the width of the flange required for riveting.

SUMMARY OF THE INVENTION

U.S. Pat. No. 1,639,530 describes a staple constructed for ready removal. The head is provided on opposite sides with outwardly extending extensions which extend the entire width of the head and from one leg to the other. The extensions form means whereby the claws of a hammer or other tool can be inserted under the flanges for removal purposes. Moreover, the opposite sides of the legs at the lower edges thereof are bevelled to provide sharp points, the opposing bevels ensuring the legs will not bend on insertion and thereby facilitating removal.

It is an object of the present invention to overcome the above-stated disadvantages of known self-pierce rivets. According to one aspect of the present invention there is provided a self-pierce rivet comprising a shank and an enlarged head at one end of the shank, the other end of the shank being provided with an axially extending slot, wherein the head is non-circular and is formed with substantially mutually perpendicular major and minor dimensions, the minor dimension of the head extending substantially parallel to the slot, the minor dimension of the head being such that the head does not extend in the direction of the minor dimension substantially beyond the cross-section of the shank of the rivet on at least one side of the shank.

Thus, a self-pierce rivet can be provided in which, at least on one side thereof, neither the head of the rivet, nor the workpiece material displaced when the rivet is applied, projects substantially beyond the shank. Thus, when the rivet is presented to the workpiece with the one side foremost a flange can be fastened at a point much closer to a wall than has hitherto been possible. This permits the use of much reduced flange widths. For example, in many cases it is possible to reduce the flange width of an automotive body pressing by fifty percent while still meeting in full the industry requirements for rigidity and security.

Thus, the shank of the self-pierce rivet according to the present invention effectively has two legs which will roll outwardly in a direction substantially parallel to the major dimension of the head when the rivet is applied. Consequently, the shape of the button of displaced material formed when the rivet is applied is modified in that material is not displaced to any significant extent in the direction of the slot.

The slot may have parallel walls, or may be tapered such that the slot narrows with increasing distance from the free end of the shank, or the slot may be profiled.

The shank may be provided with a central hole extending from the free end of the shank towards the head. The central hole may extend substantially the length of the shank. The central hole may be generally cylindrical or may be tapered, for example frustoconical, with the wider part of the hole in the region of the free end of the shank, or may be profiled. The central hole may be provided with an outwardly tapered mouth. Where a central hole is provided, the axial extent of the central hole may be at least as great as the axial extent of the slot.

The shank may be circular in cross-section or may be formed with one or more straight sides in a plane substantially parallel to the major dimension of the head.

The head may be rectangular. The term "rectangular" includes herein geometrical rectangles and also generally rectangular shapes which may, for example, have rounded corners and/or curved shorter sides.

The head may have a major dimension which extends beyond the cross-section of the shank of the rivet on at least one side of the shank.

The major dimension of the head may be at least 1.3 times the corresponding dimension of the shank.

According to another aspect of the present invention there is provided a combination of a self-pierce rivet as hereinbefore defined and a setting die, wherein the setting die is formed-with a cavity having a major dimension and a minor dimension in alignment respectively with the major dimension and the minor dimension of the head of the rivet.

The major dimension of the cavity may be at least about 1.3 times the minor dimension thereof.

The setting die may incorporate a divider to facilitate outward roll of the rivet.

The cavity of the setting die may be formed with at least one open side in the major dimension thereof.

According to a further aspect of the present invention there is provided a method of fastening shouldered workpieces by means of a combination of a self-pierce rivet and a setting die as hereinbefore defined, wherein the rivet is applied to the shouldered workpiece in a manner so as to cause the shank to splay in opposite directions corresponding to the major dimension of the head of the rivet.

The material of the workpiece displaced during application of the rivet is preferably restricted in the minor direction of the head to not more than 1.1 times the corresponding dimension of the shank of the rivet.

BRIEF DESCRIPTION OF THE DRAWINGS

For a better understanding of the present invention and to show more clearly how it may be carried into effect reference will now be made, by way of example, to the accompanying drawings in which:

FIG. 10 is an elevational view showing a number of self-pierce rivets according to the present invention and illustrating various hole and slot configurations;

FIG. 11A is a plan view showing a self-pierce rivet according to the prior art;

FIGS. 11B–11E are plan views showing a number of self-pierce rivets according to the present invention and illustrating various head configurations;

FIG. 12 is a plan view showing various shank cross-sections of self-pierce rivets according to the present invention;

FIG. 13 is a plan view showing various shank hole profiles of self-pierce rivets according to the present invention;

FIG. 14A is a plan view of a setting die form and die holder for use with self-pierce rivets according to the prior art;

FIGS. 14B–14F are plan views of various embodiments of setting die forms and die holders according to the present invention;

FIG. 15 shows a side elevational view of an embodiment of a self-pierce rivet according to the present invention;

FIGS. 15A through 15F are sectional views corresponding to FIGS. 14A through 14F;

THE ILLUSTRATED EMBODIMENTS

Figure 1:
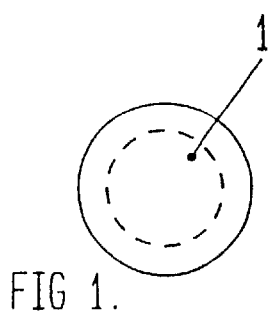
FIG. 1 is a plan view of a known self-pierce rivet.
Figure 2:
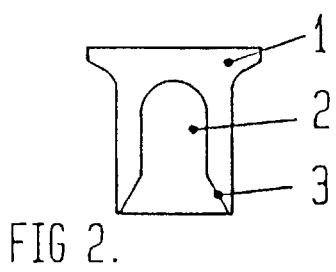
FIG. 2 is a cross-sectional view of the rivet of FIG. 1.
Figure 3:
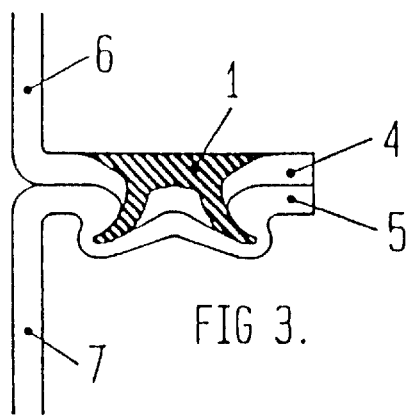
FIG. 3 is a sectional view of the rivet of FIGS. 1 and 2 applied to a flange.
Figure 4:
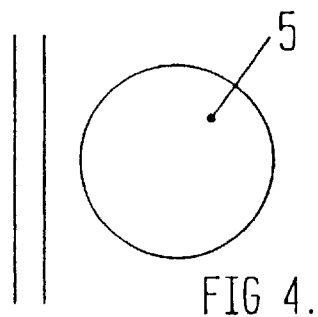
FIG. 4 is a view from below corresponding to FIG. 3 and showing a button formed in the material of the flange.

FIGS. 1 and 2 show a typical known self-pierce rivet 1 having a central hole 2 extending the length of the shank of the rivet and a tapered mouth 3. As shown in FIGS. 3 and 4, the rivet 1 can be applied to a flange 4 of an incompressible material, such as a metal, so as to produce, on that side of the flange opposite to that from which the rivet is applied, a button 5 of displaced material. As can be seen from FIGS. 3 and 4, the centre-line of the rivet is offset from shoulders 6 and 7.

Figure 5:
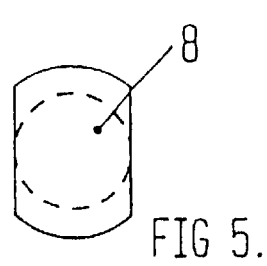
FIG. 5 is a plan view of one embodiment of a self-pierce rivet according to the present invention.
Figure 6:
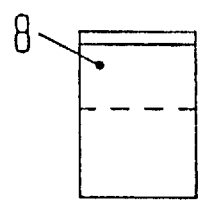
FIGS. 6 and 7 are side elevational views of the rivet shown in FIG. 5.
Figure 7:
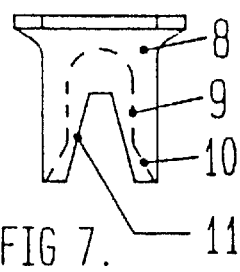

The self-pierce rivet 8 according to the present invention and shown in FIGS. 5 to 7 differs from that shown in FIGS. 1 and 2 in two respects. First, the head of the rivet is modified by removing two opposing sectors of the head up to the shank of the rivet to result in a rectangular head as defined hereinabove. Thus, the head of the rivet has two opposed arcuate portions defining therebetween a major dimension and two opposed straight portions defining therebetween a minor dimension, the straight portions being parallel to each other and being substantially tangential to the shank, giving rise to a head which has a major dimension which extends beyond the shank of the rivet and a minor dimension, perpendicular to the major dimension, which does not extend beyond the shank of the rivet. Second, the shank of the rivet is formed, in addition to a central hole 9 extending the length of the shank of the rivet and a tapered mouth 10, with a slot 11 positioned substantially perpendicular to the straight portions of the head and extending from the mouth 10 of the central hole 9 towards the closed end thereof. The slot 11 is shown as being tapered such that the slot is wider at the mouth 10 of the central hole, but this is not essential. Similarly, the axial length of the slot 11 can be adjusted to any suitable length, for example up to the length of the central hole 9.

By way of example, the major dimension of the head may be at least 1.3 times the corresponding dimension of the shank.

Figure 8:
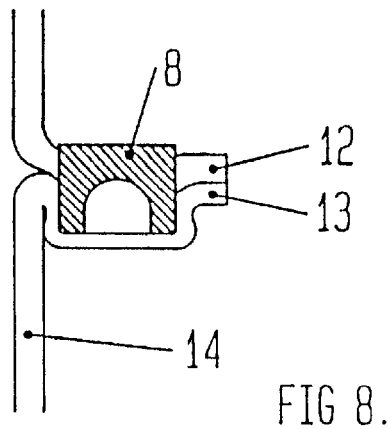
FIG. 8 is a cross-sectional view, corresponding to that of FIG. 3, of the rivet of FIGS. 5 to 7 applied to a flange.
Figure 9:
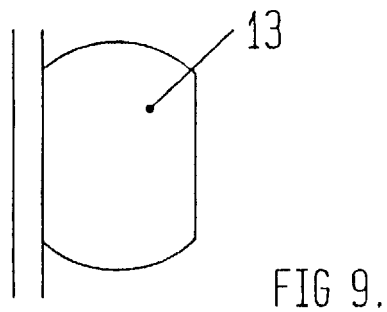
FIG. 9 is a view from below corresponding to FIG. 8 and showing a button formed in the material of the flange.

As can be seen from FIGS. 8 and 9, the rivet 8 can be applied to a flange 12 so as to produce, on that side of the flange opposite to that from which the rivet is applied, a button 13 of displaced material. As can be seen from FIGS. 8 and 9, the centre-line of the rivet 8 is offset from the shoulder 14 by a significantly smaller distance as compared with the distance a conventional rivet is offset from shoulders 6 and 7 as shown in FIGS. 3 and 4. Indeed, the rivet 8 can effectively be positioned immediately adjacent to the shoulder of the flange.

The smaller offset is due to two factors. One factor is the slot 11 in the shank of the rivet which causes the shank to splay in opposite directions. With the slot extending in a direction substantially perpendicular to the shoulder 14, the rivet 8 shown in FIGS. 5 to 7 therefore deforms to a lesser extent towards and away from the shoulder than do conventional self-pierce rivets and thus gives rise to a smaller extent of the button in a direction towards the shoulder 14 than do conventional self-pierce rivets. Consequently, the rivet 8 can be positioned closer to the shoulder 14 than can conventional self-pierce rivets. For example, it is generally possible to restrict the dimension of the button of displaced material in the direction of the minor dimension of the head to not more than 1.1 times the corresponding dimension of the shank of the rivet.

The other factor is the removal of material from the head of the rivet 8 such that the radial extent of the head is reduced substantially to that of the shank of the rivet in a direction perpendicular to the shoulder 14. This, in combination with the slot in the shank, enables the self-pierce rivet according to the present invention to be positioned closer to the shoulder than conventional self-pierce rivets.

A reduction in the width of the rivet head could lead to early failure of the joined workpiece. If necessary, this can be overcome or ameliorated by increasing the major dimension of the head. An increased major dimension of the head offers a further benefit in that the fastener then urges the components of the workpiece together over a larger area.

FIG. 10 shows a range of self-pierce rivets according to the present invention and illustrating various hole and slot configurations. Rivet 15 is formed with a tapered slot and no central hole (that is, with a solid shank). Rivet 16 is formed with a drilled central hole and a tapered slot. The central hole is formed axially in that part of the shank remote from the head, that is the lower part as shown in the drawings, and gives rise to what is known as a semi-tubular rivet. Rivet 17 is formed with a drilled central hole and a slot having substantially parallel sides. Rivet 18 is formed with a frustoconical central hole and a tapered slot. Rivet 19 corresponds to FIGS. 5 to 7 and is mechanically worked, for example extruded, to form a generally cylindrical central hole extending substantially the length of the shank of the rivet and an outwardly tapered mouth. Rivet 19 is also formed with a tapered slot. The slot, whether tapered or parallel sided, may be formed by sawing after the hole has been extruded. Thus, FIG. 10 illustrates that the rivet may be formed with a wide range of configurations of central hole, for example having parallel, tapered or profiled walls, and a wide range of slot configurations. The objective is to achieve the necessary combination of strength for piercing and freedom to roll outwardly as the sheet material is penetrated.

FIGS. 11A–11E illustrate various head configurations for self-pierce rivets according to the present invention and, for comparison purposes, according to the prior art. As shown in FIG. 11A, rivet 20 represents the prior art and is provided with a circular head having a greater diameter than the diameter of the rivet shank. In rivet 21 according to the invention as shown in FIG. 11D, two opposing sectors of the head have been removed substantially up to the shank of the rivet to produce a rectangular head as defined hereinabove. Thus, the head of the rivet has two opposed arcuate portions and two opposed straight portions, the straight portions being parallel to each other and being substantially tangential to the shank. In rivet 22 according to the invention, the head is again substantially rectangular with the minor dimension of the rectangle corresponding substantially to the diameter of the shank. In rivet 23 according to the invention, only one sector of the of the head has been removed to provide a single straight edge substantially tangential to the shank. In rivet 24 according to the invention as shown in FIG. 11E, the head is rectangular in that two opposing sectors of the head have been removed substantially up to the shank of the rivet and one of the remaining arcuate portions has been removed such that the head is substantially tangential with the shank on three sides thereof. Thus, the rivets 21, 22, 23 and 24 of FIG. 11 demonstrate that the head of the rivet may be formed with a wide range of configurations.

FIG. 12 shows various shank cross-sections of self-pierce rivets according to the present invention, although other cross-sections may be employed. For example, in addition to the circular cross-section shown in FIGS. 5 to 7, the shank 25 may be formed with a straight side or the shank 26 may be formed with opposed straight sides. Alternatively, the shank 27 may be substantially square. The use of a straight-sided shank enables the centre of the cross-sectional area of the shank to be brought closer to the shoulder of a flange.

FIG. 13 shows various shank hole profiles of self-pierce rivets according to the present invention. In the illustrated embodiments the cross-sections of the holes correspond substantially to the cross-sections of the shank, but with smaller dimensions. This is not essential, but, where the shank of the rivet is shaped in order to bring the centre of the cross-sectional area of the shank closer to a shoulder, we have found it can be helpful to keep the wall thickness of the shank reasonably constant, that is to form the hole within the shank with a profile similar to the outer profile of the shank.

Thus, in addition to the cylindrical central hole and the frustoconical central hole shown in FIGS. 5 to 7 and 10, the central hole 28 may have a straight side, for example aligned with a straight side of the shank, or the central hole 29 may have opposed straight sides, for example aligned with opposed straight sides of the shank. Alternatively, the central hole 30 may be substantially square in cross-section, for example corresponding to the sides of a square shank.

An ideal configuration of rivet could have two opposed planar surfaces formed on the shank (as in shank 26 of FIG. 12) with two corresponding sectors removed from the head (as in head 26 of FIG. 11), the shank being formed with an extruded hole and a slot as in rivet 19 of FIG. 10.

FIGS. 14A–14F are plan views of various embodiments of setting die forms and die holders for use with the self-pierce rivets according to the present invention and, for comparison purposes, for use with self-pierce rivets according to the prior art. Known die form 37 shown in FIG. 14A is circular and is provided with an annular die holder 31. As shown in FIG. 14B, die form 38 according to the invention has two opposed arcuate sides and two opposed straight sides and has a die holder 32 which has a single straight side substantially parallel to the straight sides of the die form. Thus die form 38 is elongate and is formed with a cavity having a major dimension and a minor dimension, the major dimension of the cavity being for example at least about 1.3 times the minor dimension thereof. Die form 38 is provided with a central divider (or anvil) to facilitate the outward roll of the rivet as the same is applied. As shown in FIG. 14C, die form 39 simply has two opposed arcuate sides and two opposed straight sides and has a die holder 33 which has a single straight side substantially parallel to the straight sides of the die form. As shown in FIG. 14D, die form 40 according to the invention also has two opposed arcuate sides and two opposed straight sides and has a die holder 34 which has a single straight side substantially parallel to the straight sides of the die form. Die form 40 is provided with a central divider in that it is in the form of two portions which are inclined relative to each other. As shown in FIG. 14E, die form 41 according to the invention is substantially the same as that shown in die form 40, but die holder 35 is open on one side such that the side of the die holder 35 is substantially collinear with one of the straight sides of the die form 41. As shown in FIG. 14F, die form 42 according to the invention is substantially the same as that shown in die form 40, but die holder 36 has two open sides substantially collinear with the straight sides of the die form 42. Although a central divider facilitates the outward roll of the rivet as it is applied, such a central divider generally adds to force required to apply the rivet to sheet material and a central divider is usually omitted if possible to leave a flat bottomed die. An open-sided die holder is preferred wherever practicable because it enables the die form to be mounted so that it can have close access to the wall or shoulder of a flange. An open-sided die holder can be employed in conjunction with a compensating mechanism such as that described in our PCT publication WO 94/02267 which uses pneumatic cylinders to maintain contact between the die and the shouldered material so that the shouldered material effectively functions as one side of the die.

Figure 16:
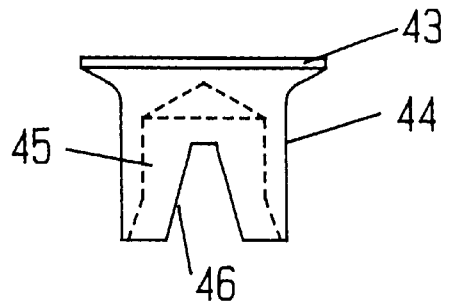
FIG. 16 shows a side elevational view of an embodiment of a self-pierce rivet
Figure 17:
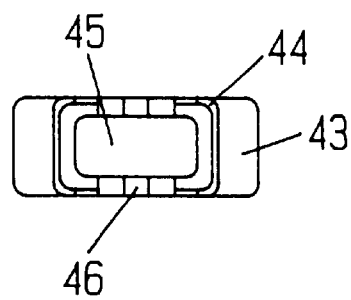
FIG. 17 shows a plan view of the self-pierce rivet shown in FIG. 16.

FIGS. 16 and 17 show a self-pierce rivet according to the present invention similar to that shown in FIGS. 5 to 7. The rivet shown in FIGS. 16 and 17 has a head 43 which is rectangular in configuration, the corners of the rectangle being rounded, and a shank 44 which is also rectangular. The shank 44 is provided with a rectangular central hole 45 extending substantially the length of the shank and having a tapered mouth. A tapered slot 46 extends substantially perpendicular to the longer sides of the head and from the mouth of the central hole towards the closed end thereof. Such a self-pierce rivet enables the rivet to be applied significantly closer to the shoulder of a flange than a round-headed rivet and also requires a lower setting force to apply the rivet than a rivet with an unslotted shank. The lower setting force results in lower distortion, especially when fastening sheet material of relatively low thickness and/or hardness. Moreover, a slotted rivet displaces less material when it is applied than does a rivet with an unslotted shank because the slotting operation reduces the material volume of the rivet. This is beneficial in two ways: there is a reduced risk of the sheet material splitting when the button is formed, and there is a reduction in the stretch of any protective coating on the outer surface of the sheet material.

Figure 18:
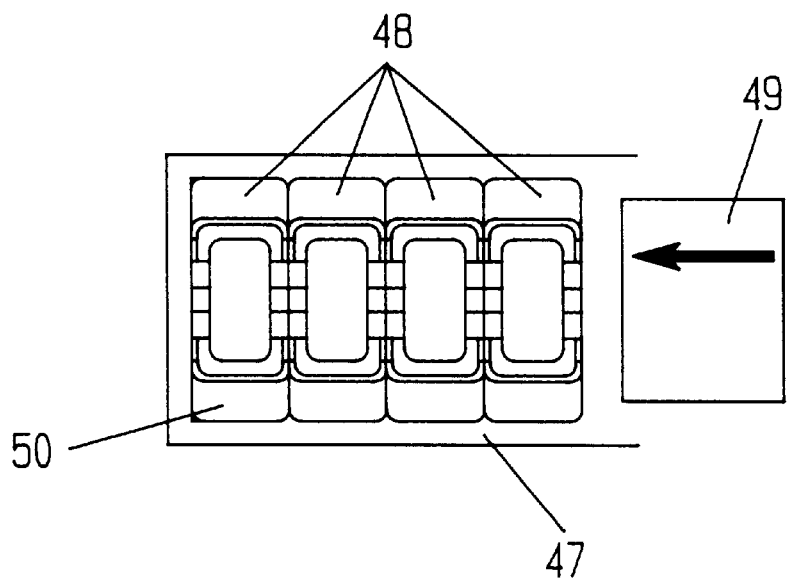
FIG. 18 illustrates the feeding of self-pierce rivets according to the present invention.

FIG. 18 illustrates the feeding of self-pierce rivets according to the present invention. A stack of self-pierce rivets 48 is supported side-by-side within a guide rail 47 and is pushed, for example intermittently, by a pusher mechanism 49 towards a feed point 50 to bring each rivet in turn to the feed point. Rivets with rectangular heads, or at least with opposed straight edges, can readily be brought into the required orientation for stack feeding.

The self-pierce rivet according to the present invention can be employed in many applications in preference to a conventional self-pierce rivet. For example, the rivet according to the invention can be used for a fastening point at the bottom of a narrow channel which is not sufficiently wide to accept the tooling required to apply a conventional self-pierce rivet. Alternatively, the rivet according to the invention can be used in a corner between two walls where the conventional head and die form restrict access into the corner. Any reduction in join strength arising from the use of a rivet according to the present invention can be offset by applying the rivet closer to the shoulder bordering the flange, channel or corner.

There is a marked trend by major users of sheet steel, such as the automotive and domestic appliance industries, towards the use of thinner gauge material. This trend, together with the introduction of light-weight materials such as aluminium, favours the use of self-pierce rivets according to the present invention, for example having a material hardness of at least 400 HV, in a wide range of applications.

What is claimed is:

1. A self-pierce rivet comprising a shank, the shank having a first end, a second, free end, and an outer periphery; and an enlarged head at the first end of the shank, the second end of the shank being provided with a bifurcating slot that extends in an axial direction of the shank, from the second end thereof and transversely therethrough, wherein the head has a non-circular outer periphery, in a plane transverse to the axial direction of the shank, and is formed with substantially mutually perpendicular major and minor dimensions, the minor dimension of the head being substantially smaller than the major dimension and extending substantially parallel to the transverse direction of extension of the slot, the minor dimension of the head being such that the outer periphery of the head does not extend in the direction of the minor dimension substantially beyond the outer periphery of the shank of the rivet on at least one side of the shank.

2. A self-pierce rivet as claimed in claim 1, wherein the slot is defined by muturally parallel walls.

3. A self-pierce rivet as claimed in claim 1, wherein the shank is provided with a central hole extending from the free end of the shank towards the head.

4. A self-pierce rivet as claimed in claim 3, wherein the central hole extends substantially the length of the shank.

5. A self-pierce rivet as claimed in claim 3, wherein the central hole is generally cylindrical.

6. A self-pierce rivet as claimed in claim 3, wherein the central hole is provided with an outwardly flared mouth.

7. A self-pierce rivet as claimed in claim 3, wherein the central hole is tapered, with the widest part of the hole in the region of the free end of the shank.

8. A self-pierce rivet as claimed in claim 7, wherein the central hole is frustoconical.

9. A self-pierce rivet as claimed in claim 3, wherein the central hole is profiled.

10. A self-pierce rivet as claimed in claim 1, wherein the shank is of circular transaxial cross-section.

11. A self-pierce rivet as claimed in claim 1, wherein the shank is formed with at least one straight side in a plane substantially parallel to the major dimension of the head.

12. A self-pierce rivet as claimed in claim 1, wherein the head is substantially rectangular.

13. A self-pierce rivet as claimed in claim 12, wherein the rectangular head is formed with longer sides and shorter sides, and wherein the shorter sides of the rectangular head are curved in said transverse plane.

14. A self-pierce rivet as claimed in claim 1, wherein the head has a major dimension which extends beyond the outer periphery of the shank on at least one side thereof.

15. A combination of a self-pierce rivet as claimed in claim 1 and a setting die, wherein the setting die is formed with a cavity having a major dimension and a minor dimension in alignment respectively with the major dimension and the minor dimension of the head of the rivet, said minor dimension of said setting die cavity being substantially smaller than said major dimension thereof.

16. A combination as claimed in claim 15, wherein the major dimension of the cavity is at least about 1.3 times the minor dimension thereof.

17. A combination as claimed in claim 15, wherein the setting die incorporates a divider to facilitate outward roll of the rivet.

18. A combination as claimed in claim 15, wherein the cavity of the setting die is formed with at least one open side in the major dimension thereof.

19. A self-pierce rivet as claimed in claim 1, wherein the slot is tapered such that the slot narrows with increasing distance from the free end of the shank.

20. A self-pierce rivet as claimed in claim 1, wherein the slot is profiled.

* * * * *